(12) United States Patent
Bryan et al.

(10) Patent No.: US 9,568,894 B2
(45) Date of Patent: Feb. 14, 2017

(54) METHOD AND CONTROL SYSTEM FOR A COMPRESSOR THAT IS OPERABLE WITH A CLIMATE SYSTEM

(75) Inventors: Paul Stephen Bryan, Belleville, MI (US); Matthew D. Smith, Dearborn Heights, MI (US); William David Treharne, Ypsilanti Township, MI (US); Susan Rebecca Cikanek, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1987 days.

(21) Appl. No.: 11/761,665

(22) Filed: Jun. 12, 2007

(65) Prior Publication Data

US 2008/0307811 A1    Dec. 18, 2008

(51) Int. Cl.
*G05B 13/02* (2006.01)
*B60H 1/32* (2006.01)
(Continued)

(52) U.S. Cl.
CPC ........... *G05B 13/021* (2013.01); *B60H 1/3211* (2013.01); *F04B 49/06* (2013.01);
(Continued)

(58) Field of Classification Search
CPC ................. G05B 13/021; B60H 1/3211; B60H 2001/3248; B60H 2001/3263; B60H 2001/3272; B60H 2001/3292; F25B 49/025; F25B 2600/025; F25B 2700/195; F25B 2700/2104; F25B 2700/2117; F04B 49/06
(Continued)

(56) References Cited

U.S. PATENT DOCUMENTS 5,007,245 A   4/1991  Defenbaugh et al.
5,099,654 A   3/1992  Baruschke et al.
(Continued)

FOREIGN PATENT DOCUMENTS

EP    0565373 B1    11/1996
JP    07-266857     10/1995
(Continued)

OTHER PUBLICATIONS

International Search Report, dated Sep. 8, 2008, 4 pages.

*Primary Examiner* — Marc Norman
(74) *Attorney, Agent, or Firm* — Brooks Kushman P.C.; David B. Kelley

(57) ABSTRACT

A control system for a compressor is provided. The control system includes a controller and first and second control portions. The first control portion is configured to assess an actual temperature of an evaporator and a target temperature of the evaporator and to generate a first compressor speed command signal. The second control portion includes a pressure calibration value and is configured to receive a pressure reading of the climate system, to compare the pressure reading to the pressure calibration value and to generate a second compressor speed command signal. The controller device includes data and is configured to receive the first compressor speed command signal and the second compressor speed command signal and to transmit a control signal to the compressor for causing the compressor to operate at a commanded compressor speed based on the first compressor speed command signal, the second compressor speed command signal, and the data.

7 Claims, 3 Drawing Sheets

(51) Int. Cl.
  *F25B 49/02* (2006.01)
  *F04B 49/06* (2006.01)
(52) U.S. Cl.
  CPC .... *F25B 49/025* (2013.01); *B60H 2001/3248* (2013.01); *B60H 2001/3263* (2013.01); *B60H 2001/3272* (2013.01); *B60H 2001/3292* (2013.01); *F25B 2600/025* (2013.01); *F25B 2700/195* (2013.01); *F25B 2700/2104* (2013.01); *F25B 2700/2117* (2013.01)
(58) Field of Classification Search
  USPC ................. 62/208, 209, 227, 228.4, 228.3
  See application file for complete search history.

(56) References Cited

U.S. PATENT DOCUMENTS

| | | | |
|---|---|---|---|
| 5,222,371 A * | 6/1993 | Doyama et al. | 62/204 |
| 5,247,806 A * | 9/1993 | Ebisu et al. | 62/204 |
| 5,572,879 A * | 11/1996 | Harrington et al. | 62/217 |
| 5,632,156 A * | 5/1997 | Takeo et al. | 62/228.4 |
| 5,669,226 A * | 9/1997 | Kurahashi et al. | 62/227 |
| 5,950,443 A * | 9/1999 | Meyer et al. | 62/228.5 |
| 6,073,457 A * | 6/2000 | Kampf et al. | 62/179 |
| 6,089,034 A | 7/2000 | Lake et al. | |
| 6,269,650 B1 * | 8/2001 | Shaw | 62/176.6 |
| 6,406,268 B1 | 6/2002 | Paice | |
| 6,588,222 B1 * | 7/2003 | Urbank et al. | 62/127 |
| 6,615,600 B2 * | 9/2003 | Shi et al. | 62/228.3 |
| 6,622,500 B1 * | 9/2003 | Archibald et al. | 62/173 |
| 6,694,764 B1 | 2/2004 | Eckstein, Jr. et al. | |
| 2002/0088240 A1 * | 7/2002 | Shi et al. | 62/180 |
| 2008/0034767 A1 | 2/2008 | Ziehr et al. | |

FOREIGN PATENT DOCUMENTS

| | | |
|---|---|---|
| JP | 2005238911 | 9/2005 |
| JP | 2006-205959 | 8/2006 |

* cited by examiner

METHOD AND CONTROL SYSTEM FOR A COMPRESSOR THAT IS OPERABLE WITH A CLIMATE SYSTEM

BACKGROUND

1. Technical Field

The embodiments described herein relate to a system and method for controlling the speed of a compressor.

2. Background Art

Climate systems conventionally include a compressor that moves and pressurizes refrigerant flowing through the climate system. Accordingly, these compressors operate at a particular speed to accommodate cooling demands.

In many conventional climate systems, the compressor operates at either a full-on mode or a full-off mode. That is, the speed of the compressor cannot be varied from a designated compressor speed. Such compressors render the climate system inefficient at meeting some cooling demands as some cooling demands require a compressor speed that differs from the designated compressor speed.

Alternatively, in some cases such as electric air conditioning compressors, the climate system may vary the compressor speed. However, it is commonly known that these systems also possess operating inefficiencies.

The embodiments described herein were conceived in view of these and other disadvantages of conventional climate systems.

SUMMARY OF THE INVENTION

The embodiments described herein include a control system and method for a compressor that is operable with a climate system. The control system may include a first control portion configured to assess an actual temperature and a target temperature. The first control portion may also generate a first compressor speed command signal based on the actual temperature and the target temperature. A second control portion may be included that is configured to determine a pressure of the climate system and generate a second compressor speed command signal based on the pressure of the climate system. In one embodiment, a controller device, having a memory with data that corresponds to compressor speeds, assesses the first compressor speed command signal, the second compressor speed command signal and the data. Accordingly, the controller device may transmit a control signal to the compressor causing the compressor to operate at an optimal compressor speed.

DETAILED DESCRIPTION OF THE EMBODIMENT(S)

Figure 1:
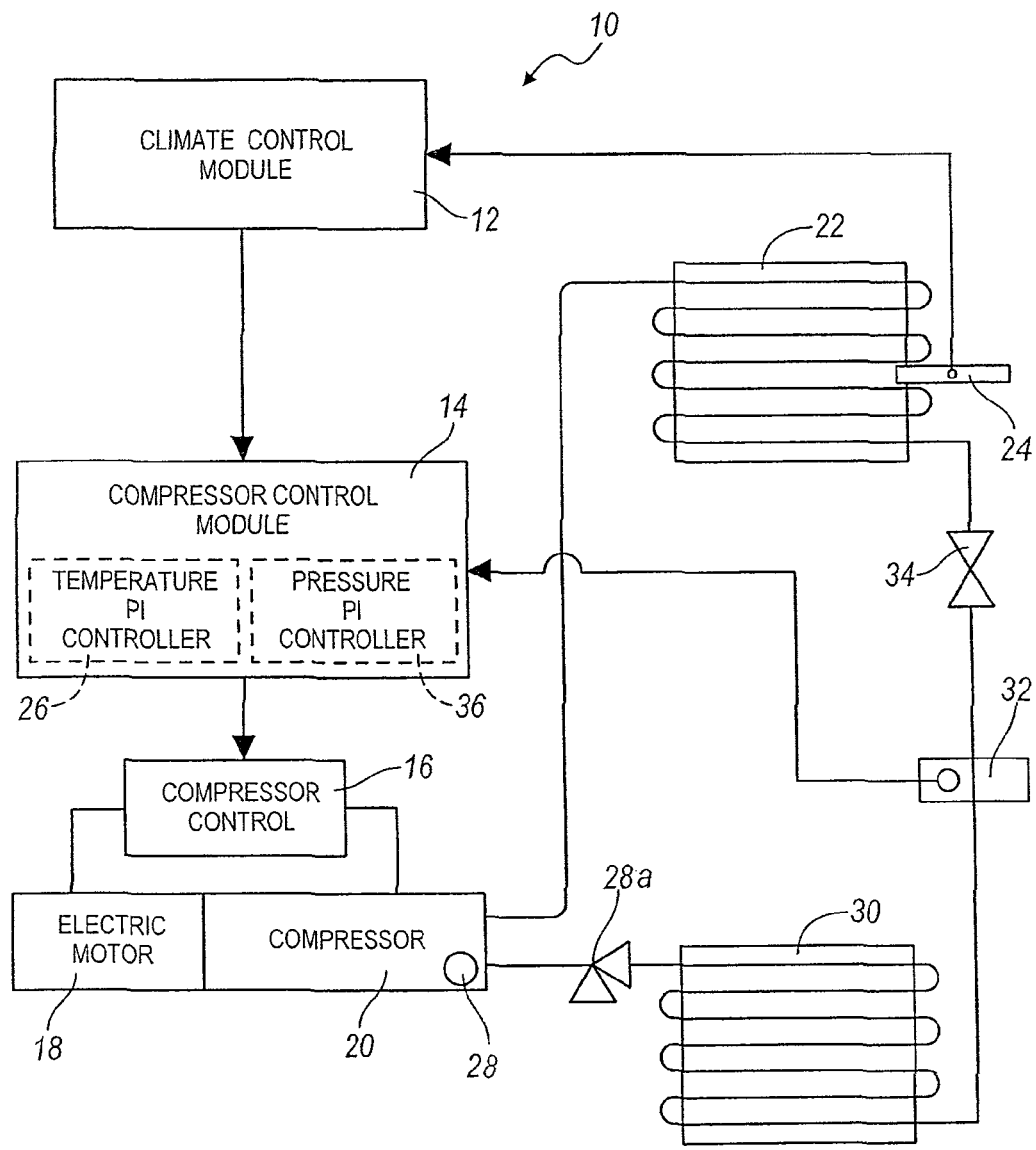
FIG. 1 illustrates a climate system in accordance with an embodiment of the present invention.

Referring to FIG. 1, a climate system 10 is shown that efficiently provides target cooling in response to cooling demands. Climate system 10 may be installed in a vehicle. It is recognized, however, that climate system 10 may be equally adapted for non-vehicular applications (e.g., buildings, homes, etc.). As shown, climate system 10 includes a climate control module 12, a compressor control module 14, an electric motor 18, compressor controls 16, a compressor 20, an evaporator 22, a pressure relief valve 28, a condenser 30, a transducer 32, a thermal expansion valve (TXV) 34, and a temperature sensor 24. It is recognized that some embodiments may have more or less devices than those shown in FIG. 1 without departing from the scope of the present invention.

Climate control module 12 and compressor control module 14 either individually or in combination may function as a controller device that processes signals received from various devices within climate system 10 to effect or maintain a target temperature of an area.

Climate control module 12, which may have a microprocessor, is adapted to communicate with a climate control user interface (not shown). The user interface allows a user to select various temperature settings for climate system 10. For example, the user interface may be used to control the air conditioning system (e.g., turn on or off, set a target temperature and the like).

To achieve various cooling demands in response to user interface settings, climate system 10 utilizes a target evaporator temperature and an actual evaporator temperature.

In one embodiment, climate control module 12 is preprogrammed with a target evaporator temperature that corresponds with various settings on the user interface. Additionally, climate control module 12 communicates with sensor 24 for a determination of the actual evaporator temperature. Upon selection of an air conditioning system setting (e.g., A/C on), climate control module 12 generates for compressor control module 14 signals that correspond to the target evaporator temperature and the actual evaporator temperature, and an air conditioning request signal.

As shown, compressor control module 14 includes a temperature proportional-integral (PI) controller 26 and a pressure PI controller 36. Temperature PI controller 26 and pressure PI controller 36 may be implemented in the form of a single or multiple controllers. It is recognized that although PI controllers are described alternative embodiments may utilize other types of controllers (e.g., proportional-integral-differential (PID) controllers, etc.) without departing from the scope of the present invention. Based on differences between the target evaporator temperature and the actual evaporator temperature, climate control module 12 (i.e., temperature PI controller 26) generates compressor speed command signals for compressor control 16. Pressure PI controller 36 is also adapted to generate compressor speed command signals based on certain system pressures.

Transducer 32, which in one embodiment is a pressure transducer, detects pressure within climate system 10 and generates signals indicating the detected pressure. Compressor control module 14 receives the signals indicative of system pressure and determines whether the system pressure is higher than a predetermined pressure threshold. In one embodiment, the predetermined pressure threshold may be within a range of 350 psi to 450 psi. It is recognized, however, that alternative embodiments may have other pressure threshold ranges without departing from the scope of the present invention.

If the system pressure is greater than the pressure threshold, compressor control module 14 (via pressure PI controller 36) may generate the compressor speed command signals. In some instances, the compressor speed command signal generated by pressure PI controller 36 causes a reduction in system pressure.

Compressor control module 14 has a memory with data that corresponds to compressor speeds. In one embodiment, the data that corresponds to the compressor speeds may be data in the form of a look-up table. Depending upon the compressor speed command signals from temperature PI controller 26 and the pressure PI controller 36, compressor control module 14 identifies a target speed within the look-up table. The target compressor speed then operates as a limit or clip that prevents the generation of a control signal (also referred to as a commanded speed signal) that may cause the compressor to operate at an undesirable speed. The target compressor speed that limits the actual compressor speed is transmitted, in the form of electrical signals, to a compressor control 16.

Compressor control 16 may be implemented as a configuration of electric devices (e.g., transistors, diodes, microelectronic chips, etc.) that enable the generation of control signals for compressor 20. In one embodiment, compressor control 16 may be implemented with compressor control module 14. As shown, compressor control 16 is operable with an electric motor 18 and compressor 20. As recognized by one of ordinary skill in the art, electric motor 18 may be directly coupled to and enable the operation of compressor 20.

Upon the receipt of the compressor command signals, compressor control 16 is adapted to generate the control signals for energizing compressor 20. That is, compressor 20 may be energized to suction low pressure gas or vapor from evaporator 22 and discharge high pressure gas or vapor, which is condensed into a high pressure liquid by condenser 30.

As shown, compressor 20 may also include a pressure relief valve 28 that opens in response to high pressure. Additionally, a high pressure relief valve 28a may be disposed between compressor 20 and condenser 30. Relief valve 28 (or 28a) may also be designed to open when pressure between compressor 20 and condenser 30 exceeds a target pressure limit.

TXV 34 is disposed between condenser 30 and evaporator 22 and serves as a separating device that separates the high pressure side of climate system 10 from the low pressure side. Accordingly, TXV 34 meters the flow of liquid refrigerant that flows from condenser 30 into evaporator 22.

Figure 2:
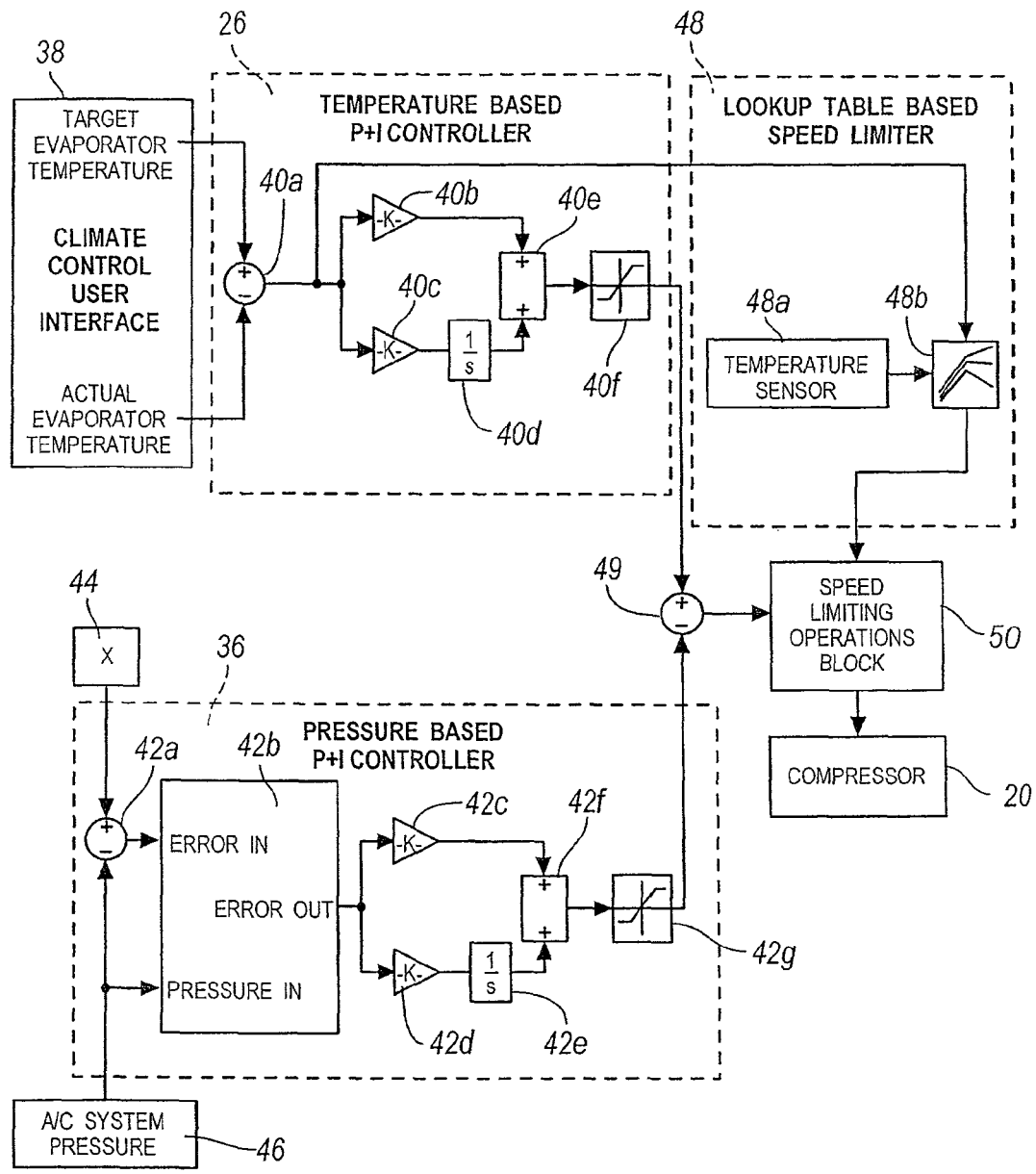
FIG. 2 provides a detailed illustration of a control system that is operable with the climate system of FIG. 1.

Now, referring to FIG. 2, a detailed schematic diagram of the temperature PI controller 26, the pressure PI controller 36, and a compressor speed limiter 48 is provided. Controllers 26 and 36 may be integrated into a single electronic device or separately packaged as shown in FIG. 1. Limiter 48 may be a separate controller or integrated with temperature PI controller 26 and/or pressure based controller 36.

User interface box 38 illustrates the generation of the target evaporator temperature and actual evaporator temperature signals. The signals that correspond to the target and actual evaporator temperatures are received at a summation point 40a. The resulting signal from summation point 40a may be referred to as a temperature error signal. The temperature error signal may then be fed directly into a data look-up table 48b. The error signal is also fed into a proportional gain 40b and an integral gain 40c.

Once the error signal traverses proportional gain 40b, it is received and integrated by an integrator 40d. The integrated signal is then summed along with a signal from proportional gain 40b at a device 40e. A limiting device 40f limits the range of authority of temperature PI controller 26. That is, limiting device 40f prevents the temperature PI controller 26 from generating a compressor speed command signal that causes an undesirable compressor speed. The signal that is transmitted from limiting device 40f is received at a summation point 49.

As shown, pressure PI controller 36 initially receives a calibration value as indicated by block 44. The calibration value may be stored in a memory of controller 36 and serve as a target maximum system pressure. A transducer 46, which may be a pressure sensor, generates corresponding pressure signals that are fed into a summation point 42a along with the calibration value. The resulting signal from summation point 42a may be referred to as an actual pressure error signal. The actual pressure error signal is supplied to a device 42b. Device 42b may be a logic device or switch. As shown, device 42b receives the pressure signal as detected by device 46.

Device 42b determines whether pressure PI controller 36 remains in an on state or an off state. Device 42b receives an "ERROR IN" signal, a "PRESSURE IN" signal and generates an "ERROR OUT" signal. If the "PRESSURE IN" signal, as received from transducer 46, is greater than the calibration value, then the "ERROR OUT" signal is equal to the "ERROR IN" signal. Alternatively, if the "PRESSURE IN" signal is less than the calibration value, then the "ERROR OUT" signal is zero. Thus, when the "PRESSURE IN" is less than the calibration value, the pressure PI controller does not generate a compressor speed command signal.

Alternatively, when the "ERROR OUT" signal equals the "ERROR IN" signal (i.e., the "PRESSURE IN" is greater than the calibration value), the "ERROR OUT" signal is received by a proportional gain device 42c and an integral gain device 42d. The signal received from integral gain device 42d is integrated by an integrator 42e. The signals from integrator 42e and proportional gain device 42c are summed together at a summing device 42f. Accordingly, limiting device 42g limits the range of authority of the pressure PI controller 36. That is, the device 42g calibrates the pressure PI controller 36 so as to not lower the compressor speed below a target speed.

The signal that is transmitted from device 42g may be referred to as a compressor speed command signal. The compressor speed command signal from device 40f and device 42g are summed at a summation point 49. As shown in limiter block 48, the look-up table 48b receives temperature signals from a temperature sensor 48a.

The signals from sensor 48a may indicate an ambient or an apparent temperature. It is recognized that the apparent temperature may include an ambient temperature plus considerations for sun load, humidity, interior temperature, etc. The look-up table, having received the temperature error signal from summation point 40a and the temperature signal from sensor 48a identifies the target compressor speed that corresponds to the signals received from summation point 40a and sensor 48a. The target compressor speed functions as limit to the actual compressor speed. Once a corresponding compressor speed is identified, a signal is generated and transmitted to a speed limiting operations block 50.

As shown, operation block 50 also receives the resulting signal from summation point 49. Operation block 50 clips the sum of output speeds of the temperature PI controller and the pressure PI controller to a speed that is no greater than the output of look-up table 48b. Accordingly, a control signal (also referred to as a commanded speed signal), as generated by compressor control 16 (FIG. 1) that includes operations block 50 is received at the compressor 20. In response to the control signal, compressor 20 operates at an optimal speed.

Figure 3:
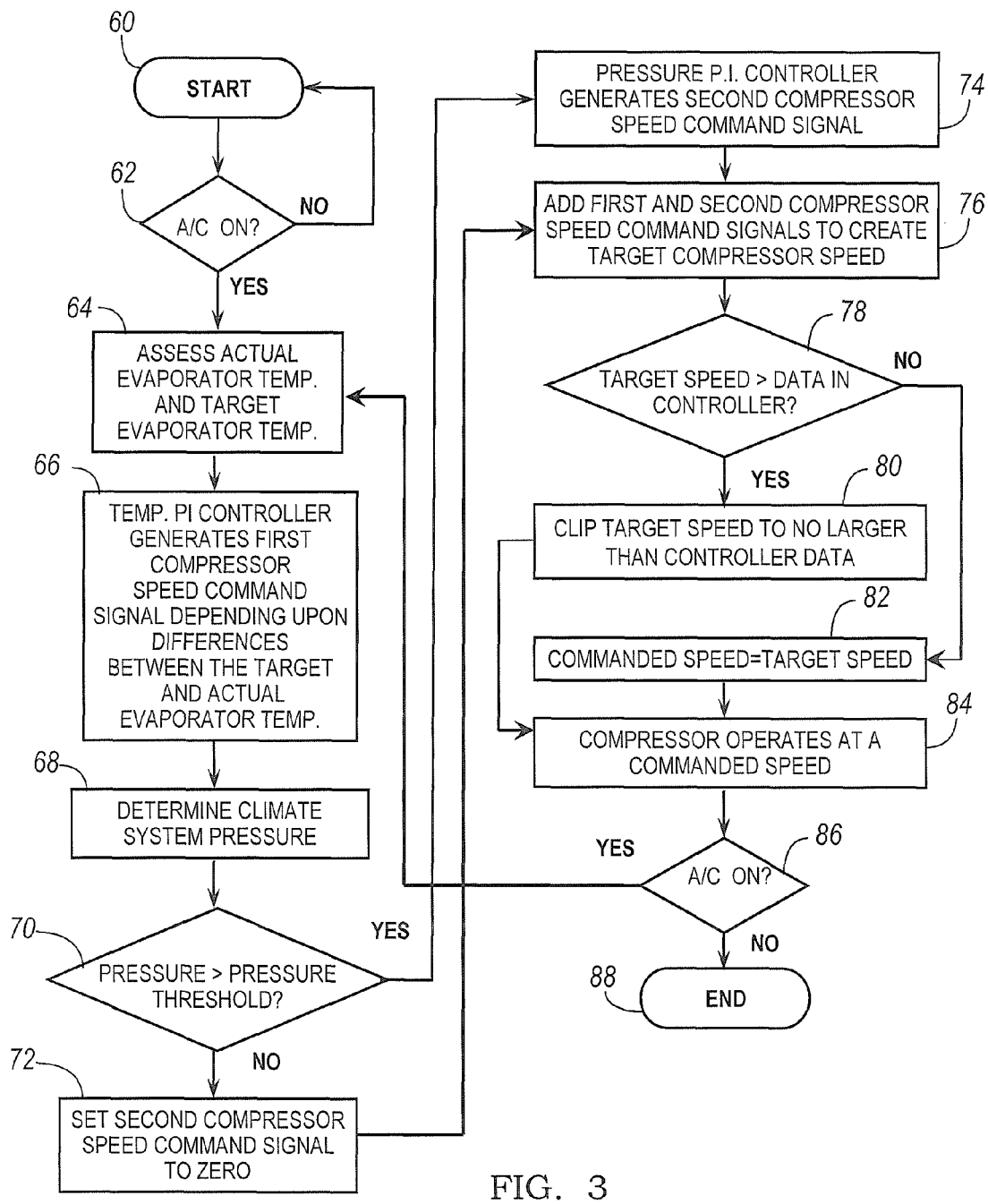
FIG. 3 illustrates a flow chart of a method for controlling a compressor in accordance with an embodiment of the present invention.

Now referring to FIG. 3, a flow chart illustrates a method for controlling the speed of a compressor. Block 60 is the starting point for the method. At block 62, the method includes determining whether the air conditioning system is on. It is recognized that block 62 also includes requests by the climate system to energize the compressor. If the air conditioning system is not on, the method returns to block 60. If the air conditioning system is on, a block 64 occurs. At a block 64, the actual and target evaporator temperatures are assessed. Additionally, as shown in block 66, the temperature PI controller generates a first compressor speed command signal. This speed command signal may have a value that corresponds to the differences between the target and actual evaporator temperature.

At block 68, the method determines a pressure of the climate system. At block 70, the method includes determining whether the pressure of the climate system is greater than a pressure threshold. If the pressure is not greater than the pressure threshold, the method proceeds to block 72 where a second compressor speed command signal is set to a value of zero. Accordingly, as shown at block 76, the first and second compressor speed command signals are added to establish a target compressor speed.

The target compressor speed may then be compared with the data (e.g., compressor speed data) stored within the controller as shown by block 78. The compressor speed data corresponds includes data that corresponds with compressor operating speeds. If the target speed is greater than compressor speed data, block 80 occurs. As depicted by block 80, the target speed is clipped to a value that is no greater than the compressor speed data stored in the controller. Accordingly, the control signal (or commanded speed signal) is transmitted to compressor so as to cause the compressor to operate at the commanded speed (block 84). At block 86, it is determined whether the air conditioning system remains on. If so, the method returns to block 64. If the air conditioning system is not on the method ends at block 88.

Referring back to block 78, if the target speed is not greater than the data in the controller, the method proceeds to block 82. As shown by block 82 the commanded speed (being transmitted as the control signal) is set equal to the target speed. As such, the compressor operates at the commanded speed as shown by block 84. Following block 84, the method proceeds to block 86 as described above.

Now, referring back to block 70, if the climate system pressure is greater than the pressure threshold, a block 74 occurs. At block 74, the pressure PI controller establishes and generates a second compressor speed command signal. Following block 74, block 76 occurs wherein the first and second compressor speed command signals are added to create the target compressor speed signal. Following block 76, the method continues to block 78 and proceeds as described above.

While the best mode for carrying out the invention has been described in detail, those familiar with the art to which this invention relates will recognize various alternative designs and embodiments for practicing the invention as defined by the following claims.

What is claimed:

1. A control system for a vehicle compressor that is operable with a vehicle climate system comprising:
   a first control portion being configured to assess an actual temperature of a vehicle evaporator and a target temperature of the vehicle evaporator for generating a first compressor speed command signal in response to assessing the actual temperature and the target temperature;
   a second control portion including a pressure calibration value and being configured to receive a pressure reading of the climate system, to compare the pressure reading to the pressure calibration value, to generate a second compressor speed command signal if the pressure reading is greater than the pressure calibration value;
   a controller device including data corresponding to at least one compressor speed, the controller being configured to receive the first compressor speed command signal and the second compressor speed command signal and to transmit a control signal to the vehicle compressor for causing the vehicle compressor to operate at a commanded compressor speed based on the first compressor speed command signal, the second compressor speed command signal, and the data; and
   a speed limiter being configured to receive an apparent temperature reading for establishing a maximum compressor speed therefrom, the apparent temperature reading corresponding to the at least one compressor speed as identified in the data,
   wherein the apparent temperature includes at least an ambient temperature, humidity, and an interior temperature of a vehicle.

2. An apparatus for controlling a vehicle compressor that is operative with a vehicle climate system, the apparatus comprising:
   a compressor control unit configured to:
      store data corresponding to at least one compressor speed;
      monitor an actual temperature of a vehicle evaporator;
      provide a target temperature of the vehicle evaporator;
      generate a first compressor speed command signal based on the actual temperature and the target temperature;
      monitor a pressure value within the vehicle climate system;
      compare the pressure value to a pressure threshold;
      provide a second compressor speed command signal that is indicative of the pressure value being greater than the pressure threshold;
      add the first compressor speed command signal to the second compressor speed command signal to generate a first signal; and
      cause the vehicle compressor to operate at a target compressor speed that is based on the first signal and the data.

3. The apparatus of claim 2 wherein the compressor control unit is further configured to receive an apparent temperature reading to establish a maximum compressor speed therefrom, the apparent temperature reading corresponding to the at least one compressor speed as identified in the data.

4. The apparatus of claim 3 wherein the compressor control unit is further configured to control the vehicle compressor such that the compressor operates at a speed that is not greater than the maximum compressor speed if the first signal corresponds to a compressor speed that exceeds the maximum compressor speed.

5. The apparatus of claim 3 wherein the apparent temperature includes at least an ambient temperature, humidity and an interior temperature of a vehicle.

6. An apparatus for controlling a vehicle compressor that is operative with a vehicle climate system, the apparatus comprising:
   a compressor control unit configured to:
      receive an apparent temperature to determine a maximum compressor speed;
      monitor an actual temperature of a vehicle evaporator;
      provide a target temperature of the vehicle evaporator;
      provide a first compressor speed command signal based on the actual temperature and the target temperature;
      monitor a pressure value within the vehicle climate system;
      compare the pressure value to a pressure threshold;
      provide a second compressor speed command signal that is indicative of the pressure value being greater than the pressure threshold;
      provide a first compressor speed based on the first compressor speed command signal and the second compressor speed command signal;
      control the vehicle compressor to operate at the first compressor speed if the first compressor speed is less than the maximum compressor speed; and
      control the vehicle compressor to operate at the maximum compressor speed if the first compressor speed is greater than the maximum compressor speed.

7. The apparatus of claim 6 wherein the apparent temperature includes at least an ambient temperature, humidity and an interior temperature of a vehicle.

* * * * *